United States Patent
Murata et al.

[11] Patent Number: 6,154,324
[45] Date of Patent: Nov. 28, 2000

[54] MACRO LENS SYSTEM

[75] Inventors: Masayuki Murata; Takayuki Ito, both of Saitama-ken, Japan

[73] Assignee: Asahi Kogaku Kogyo Kabushiki Kaisha, Tokyo, Japan

[21] Appl. No.: 09/205,716

[22] Filed: Dec. 4, 1998

[30] Foreign Application Priority Data

Dec. 4, 1997 [JP] Japan .................................. 9-334419

[51] Int. Cl.⁷ .............................. G02B 15/22; G02B 9/00
[52] U.S. Cl. ............................................ 359/693; 359/740
[58] Field of Search .................................. 359/693, 692, 359/691, 683, 676, 738–740, 705, 793, 795

[56] References Cited

U.S. PATENT DOCUMENTS

| | | | |
|---|---|---|---|
| 4,508,433 | 4/1985 | Kitagishi et al. | 359/745 |
| 4,666,260 | 5/1987 | Itoh | 359/745 |
| 4,772,108 | 9/1988 | Sugiyama | 359/761 |
| 4,923,292 | 5/1990 | Matsuo | 359/754 |
| 4,986,643 | 1/1991 | Moriyama | 359/693 |
| 5,331,464 | 7/1994 | Ito et al. | 359/691 |
| 5,592,234 | 1/1997 | Oshikiri et al. | 359/689 |
| 5,850,577 | 12/1998 | Ito | 396/80 |

FOREIGN PATENT DOCUMENTS 61-138912  6/1986  Japan .

*Primary Examiner*—Georgia Epps
*Assistant Examiner*—Jordan M. Schwartz
*Attorney, Agent, or Firm*—Greenblum & Bernstein, P.L.C.

[57] ABSTRACT

A macro lens system includes a positive first lens group, an aperture and a negative second lens group arranged in the order from an object side. The driving mechanism drives the lens groups and the aperture to move independently along an optical axis for focusing. When the lens groups are moved toward the object side, the aperture is also moved to the object side. The moving amount of the aperture is determined to control increasing of an effective F-number. The moving amount of the aperture is smaller than that of the first lens group and is larger than that of the second lens group.

15 Claims, 14 Drawing Sheets

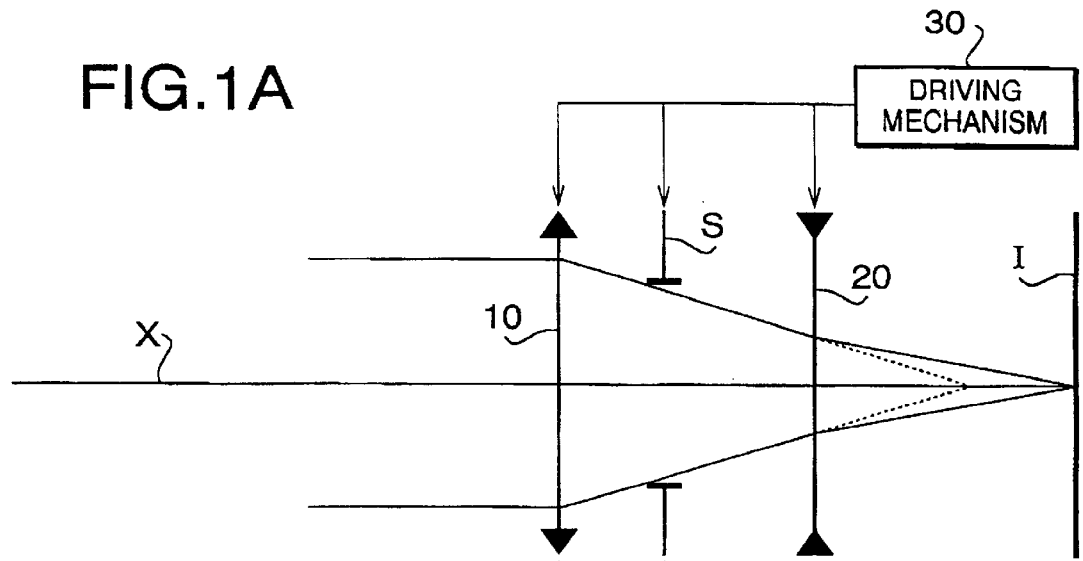
FIG.1A
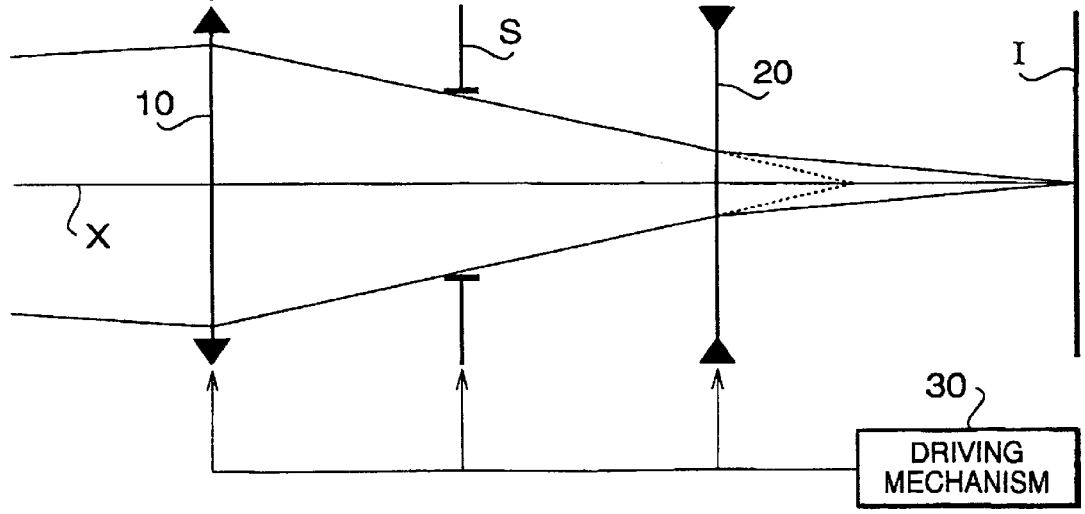
FIG.1B
FIG.1C

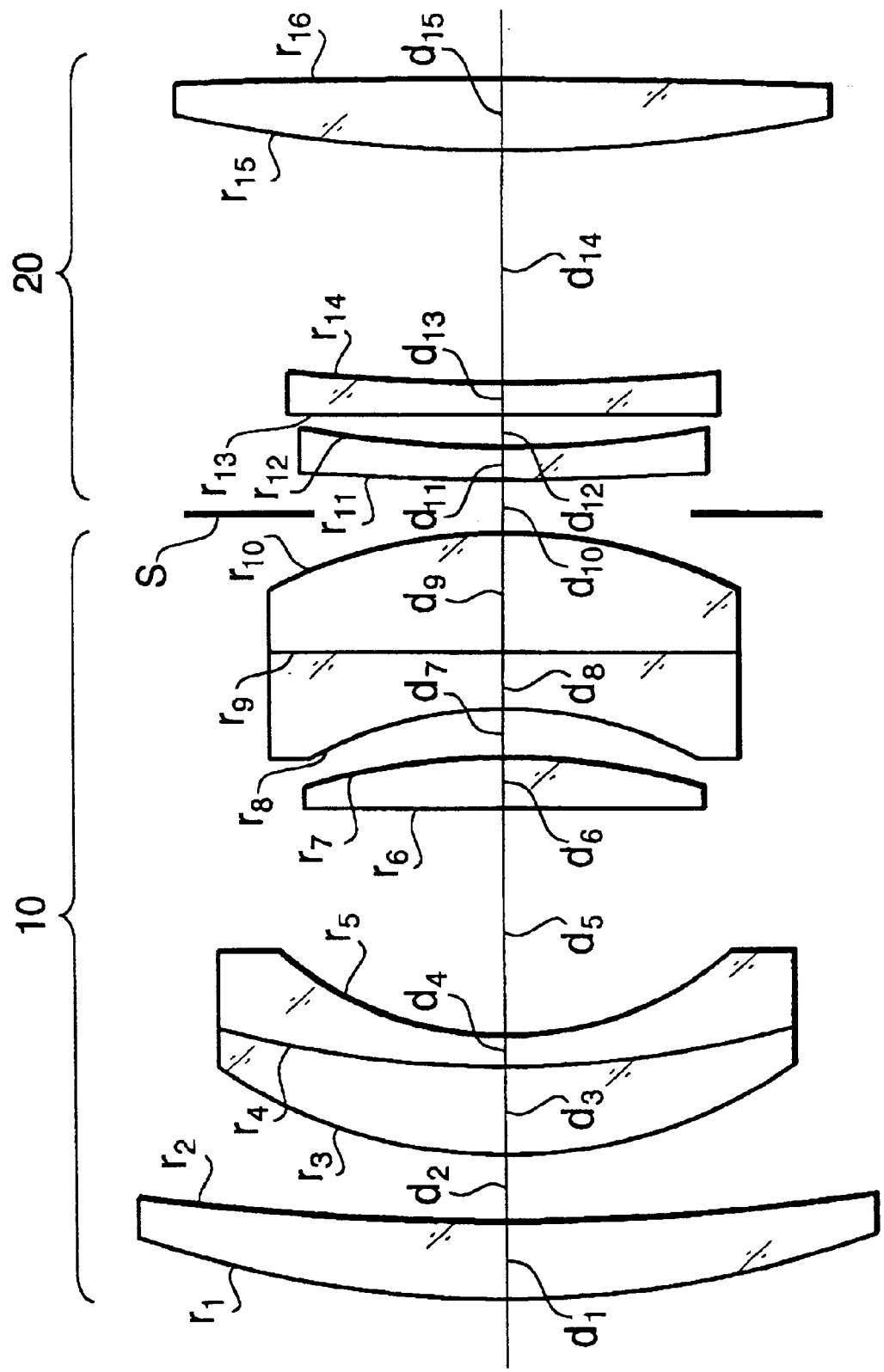

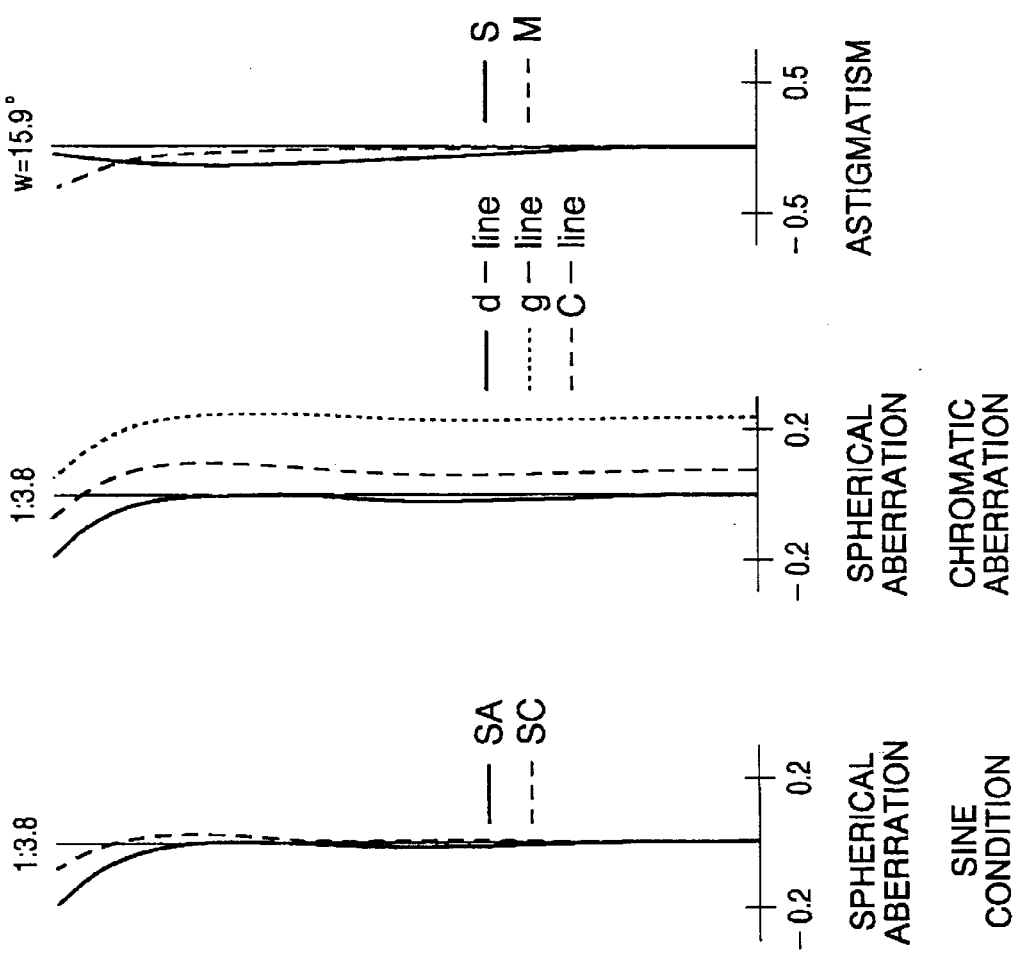

MACRO LENS SYSTEM

BACKGROUND OF THE INVENTION

The present invention relates to a macro lens system for a camera, particularly, for an auto-focus camera.

As an auto-focus (automatic focus) system, a TTL (Through The Lens) auto-focus system, which utilizes light passed through a photographing lens of a camera for an auto-focus operation, has been known. The TTL auto-focus system requires that the camera is provided with a lens having a small F-number. Generally, if an effective F-number at a full-open aperture is larger than "7", light amount received by a sensor of the auto-focus system is too small for reliable operation.

As one of photographing lenses, a macro lens is known. In the macro lens, when the focusible range thereof is broadened, the effective F-number thereof varies within a relatively wide range. That is, the effective F-number is maximum when the lens is set to focus on an object at the minimum object distance, and the effective F-number becomes minimum when the lens is set to focus on an object at the infinity. The maximum F-number of the macro lens may exceed the upper limit required by the auto-focus system if a reasonable lens size is to be maintained.

In an example of a conventional macro lens for a middle or large format camera, the minimum F-number is "4" at infinity and the maximum F-number is "8" at the minimum object distance. This maximum F-number is too large for the auto-focus system to operate.

If the conventional macro lens is designed so that the maximum F-number is approximately equal to "6", the minimum F-number becomes approximately "3". Although such a macro lens allows operation of the auto-focus system even at the minimum object distance, the size of the lens (i.e., diameter and length) will become too large to use practically. It is because, at a given focal length, the smaller the minimum F-number is, the larger the lens diameter becomes to keep the light amount, and the larger the number of lenses are required to reduce aberrations.

SUMMARY OF THE INVENTION

It is therefore an object of the present invention to provide an improved macro lens system that enables an auto-focus system to operate even when the lens is set to focus on an object at the minimum object distance, with maintaining a reasonable lens size.

According to an aspect of the invention, there is provided a macro lens system, of which a focusing state is adjustable between an infinite focusing state where the macro lens system focuses on an object at infinity and a close focusing state where the macro lens system focuses on an object at the minimum object distance. The macro lens system is provided with a focusing lens group that moves along an optical axis between an infinite focusing position which is close to an image plane at the infinite focusing state and a close focusing position which is far from the image plane at the close focusing state; an aperture that is movable along the optical axis; and a driving mechanism for independently moving the focusing lens group and the aperture along the optical axis, wherein the driving mechanism moves the aperture toward the object side to control increasing of an effective F-number as the focusing lens group is moved to the object side.

With this construction, since the position of the aperture is controlled such that the effective F-number at the close focusing state does not become too large and that the effective F-number at the infinite focusing state does not become too small, an auto-focus system is able to operate at any focusing states of the lens, without increasing the lens size.

The focusing lens group may be provided with a first lens group having a positive power and a second lens group having a negative power, the first and second lens groups being driven to move along the optical axis in the same direction, the first and second lens groups being located at positions closer to an object when the object is closer, a distance between the first and second lens groups being greater as an object is closer; an aperture provided between the first and second lens groups; and the driving mechanism moves the aperture toward the object side as the first and second lens groups are moved towards the object, the moving amount of the aperture being smaller than the moving amount of the first lens group.

It is preferable that the macro lens system satisfies the following conditions:

| | |
|---|---|
| $0.5 < Fe/\{F(1 - Mc)\} < 0.9$ | (1), |
| $Fe < 7$ | (2), | where,

F is an effective F-number at the infinite focusing state;

Fe is an effective F-number in the close focusing state; and

Mc is a lateral magnification in the close focusing state.

Further, the following conditions (3) and (4) are preferably satisfied:

| | |
|---|---|
| $0.5 < XS/X1 < 1.0$ | (3), |
| $0 < X2/X1 < 0.5$ | (4), | where,

X1 is a total moving amount of the first lens group for the entire focusing range;

XS is a total moving amount of the aperture for the entire focusing range; and

X2 is a total moving amount of the second lens group for the entire focusing range.

The full-opening diameter of the aperture can be constant in spite of the focusing state or can be changed such that the full-opening diameter increases as the focusing lend group moves toward the object.

BRIEF DESCRIPTION OF THE ACCOMPANYING DRAWINGS

FIGS. 1A through 1C show an optical construction of a macro lens system of the present invention and loci of movement of the lenses;

FIG. 2 shows a macro lens system according to a first embodiment at an infinite focusing state;

FIGS. 3A–3D show various aberrations of the macro lens system shown in FIG. 2 at the infinite focusing state;

DETAILED DESCRIPTION OF THE PREFERRED EMBODIMENTS

FIGS. 1A and 1C show a configuration of a macro lens system 1000 according to the invention, and FIG. 1B shows loci of the lenses and an aperture. The macro lens system 1000 includes a first lens group 10 that has a positive refractive power, an aperture S, and a second lens group 20 that has a negative refractive power arranged in the order from an object side (i.e., from the left-hand in FIGS. 1A and 1C).

The macro lens system 1000 further includes a driving mechanism 30 that independently moves the first lens group 10, the aperture S and the second lens group 20 along an optical axis X for focusing.

FIG. 1A shows an infinite focusing state of the macro lens system currently focus on an object at infinity, where the first lens group 10 is close to an image plane I. A film of a camera is positioned at this image plane I. FIG. 1C shows a close focusing state focused on an object at the minimum object distance where the first lens group 10 is fa from the image plane I. Lateral magnification M of the macro lens system at the close focusing state is equal to life-size (M=−1).

The driving mechanism 30 drives the first lens group 10 toward the object side as the object distance is smaller and drives the second lens group in the same direction but by a smaller amount as shown in FIG. 1B. Thus, the distance between the first and second lens groups 10 and 20 increases with movement of the lens groups 10 and 20 toward the object side.

The driving mechanism 30 also moves the aperture S toward the object side as the first and second lens groups 10 and 20 are moved to the object side. The moving amount of the aperture S is smaller than that of the first lens group 10 and is larger than that of the second lens group 20. At the given position of the first lens group 10, the larger the distance between the first lens group 10 and the aperture S is, the smaller the effective F-number is. The driving mechanism 30 moves the aperture S to control increasing of the effective F-number at the close focusing state.

In the embodiment, the full-opening diameter of the aperture S is constant in spite of the movement thereof. It should be noted that, it can be modified such that the full-opening diameter may change with respect to the position of the aperture S.

The adjustment of the aperture position is effective to make sufficient amount of light incident on the auto-focus sensor without increasing the lens size. That is, the effective F-number at the infinite focusing state is not so small (approximately "4"), it is not required a larger size lens, while allowing a sufficient F-number (approximately "6") at the close focusing state.

Figure 14:
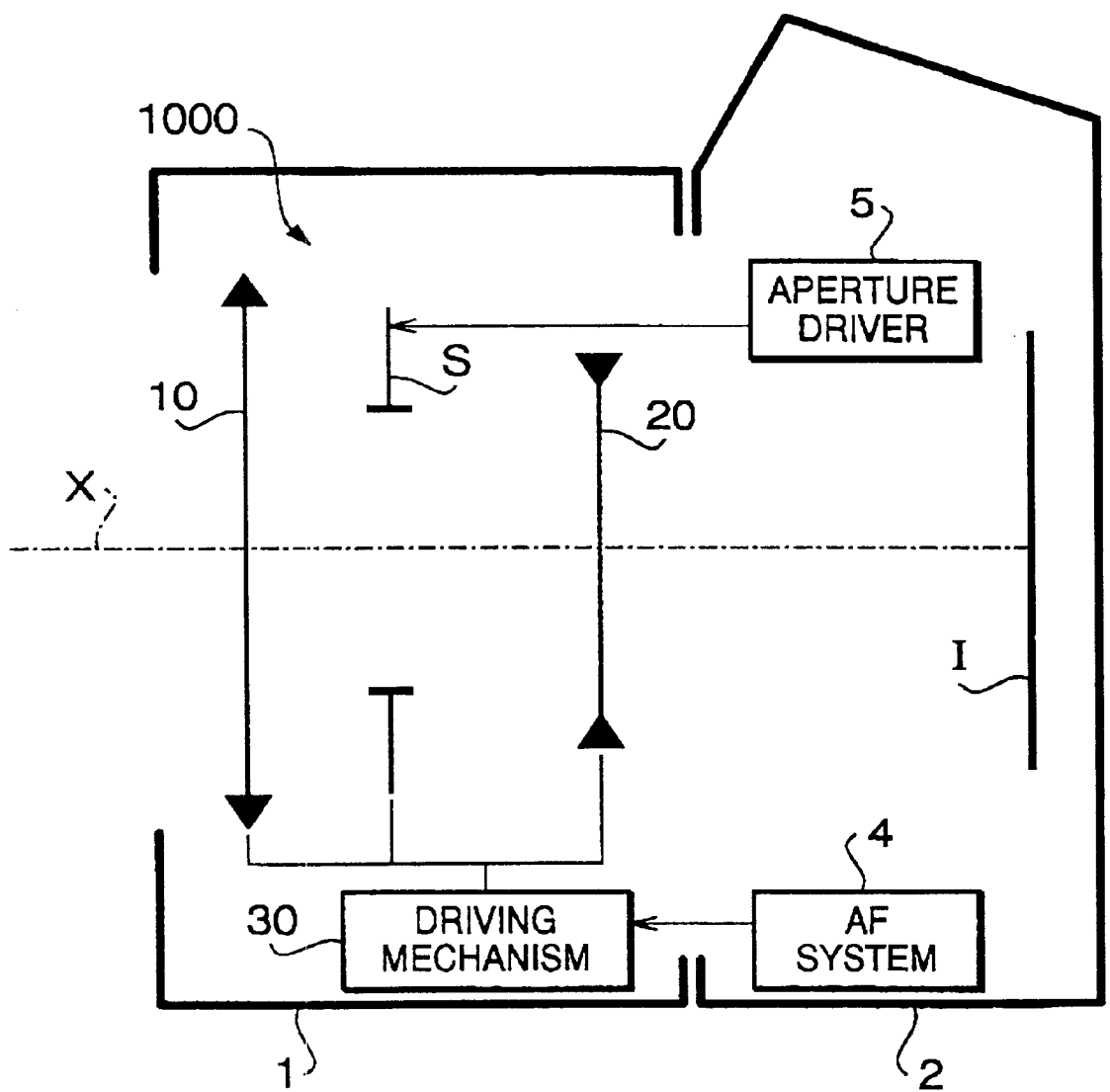
FIG. 14 shows a block diagram of a camera that includes a lens unit and a camera body.

FIG. 14 shows a auto-focus single lens reflex camera of which lens unit employs the macro lens system 1000 described above. The camera comprises a lens unit 1 and a camera body 2.

The lens groups 10 and 20 are held in the lens unit 1. The driving mechanism 30 is a cam mechanism that functions, for example, such that the lens groups 10, 20 and the aperture S moves along the optical axis X.

An auto-focus (AF) system 4 is provided in a camera body 2. Specifically, the auto-focus system 4 is provided with a sensor to receive light directed from an object and passed through the first and second lens groups 10 and 20 and a motor that is engaged with the driving mechanism 30 to drive the driving mechanism 30 in accordance with the detected signal output by the sensor.

The opening/closing operation of the aperture S is controlled from the camera body 2.

In general, an interchangeable lens unit for a single lens reflex camera is provided with a spring that forces the aperture to be minimize the opening diameter and a drive pin that changes the opening diameter of the aperture.

The lens unit 1 of the embodiment also includes the spring and the drive pin. The camera body 2 is provided with an aperture driver 5 that includes a drive lever engaged with the drive pin when the lens unit 1 is attached to the camera body 2, and a motor to control the drive lever. The drive lever usually pushes the drive pin to fully open the aperture S against the spring force. As a result, the aperture S is fully opened when the AF system 4 detects the focusing state. At the time of shutter-release, the drive lever moves to a position to obtain a predetermined exposure value. After the shutter-release, the drive lever returns back the position where the aperture is fully opened.

According to the embodiment, the macro lens system satisfies the following conditions:

| | |
|---|---|
| $0.5 < Fe/\{F(1 - Mc)\} < 0.9$ | (1) |
| $Fe < 7$ | (2) |
| $0.5 < XS/X1 < 1.0$ | (3), |
| $0 < X2/X1 < 0.5$ | (4), |

$$0 < X2/X1 < 0.5 \quad (4),$$

where,

F is an effective F-number when the lens is set in the infinite focusing state;

Fe is an effective F-number when the lens is set in the close focusing state;

Mc is lateral magnification when the lens is set in the close focusing state;

Xl is a total moving amount of the first lens group for the entire focusing range;

XS is a total moving amount of the aperture for the entire focusing range; and

X2 is a total moving amount of the second lens group for the entire focusing range.

Condition (1) defines a ratio of F-number at the close focusing state to F-number at the infinite focusing state. If condition (1) is satisfied, the F-number varies within a relatively small range when the status of the lens changes between the infinite focusing state and the close focusing state. If the ratio is larger than the upper limit, the varying range of F-number will be too large. That is, even if the F-number at the infinite focusing state is made small, the F-number at the close focusing state becomes too large to keep enough light amount for the normal operation of the auto-focus system. If the ratio is smaller than the lower limit, a larger lens will be required for the first lens group 10.

Condition (2) directly defines the F-number at the close focusing state. In order to allow a sufficient amount of light to be incident on the auto-focus system at the close focusing state, condition (2) should be satisfied.

Condition (3) defines a ratio of the total moving amount of the aperture S to that of the first lens group 10. When the ratio exceeds the upper limit, since the total moving amount of the aperture S exceeds that of the first lens group 10, it becomes difficult to control the change of the effective F-number. When the ratio is lower than the lower limit, marginal rays cut across the optical axis X before the rays pass the aperture S at the close focusing state, which decreases brightness of the periphery of the image at the small aperture diameter.

Condition (4) defines a ratio of the total moving amount of the second lens group 20 to that of the first lens group 10. Satisfaction of condition (4) provides a well-balanced lens in either size or performance. When the ratio exceeds the upper limit, the total moving amounts of the first and second lens groups for the entire focusing range becomes larger, which requires a larger diameter and a longer length of the lens system to allow sufficient amount of light to be incident on the auto-focus system. On the other hand, when the ratio is lower than the lower limit, the second lens group 20 moves an opposite direction to the first lens group 10 for focusing. In such a condition, movement of a lens group may prevent movement of the other lens when they are moved towards positions for the infinite focusing state, a longer back-focus may become necessary, and the distance between the lens groups becomes larger at the close focusing state. Thus, it is preferable that the ratio is greater than the lower limit.

Next, numerical embodiments will be described with reference to FIGS. 2 through 13.

First Embodiment

Figure 4:
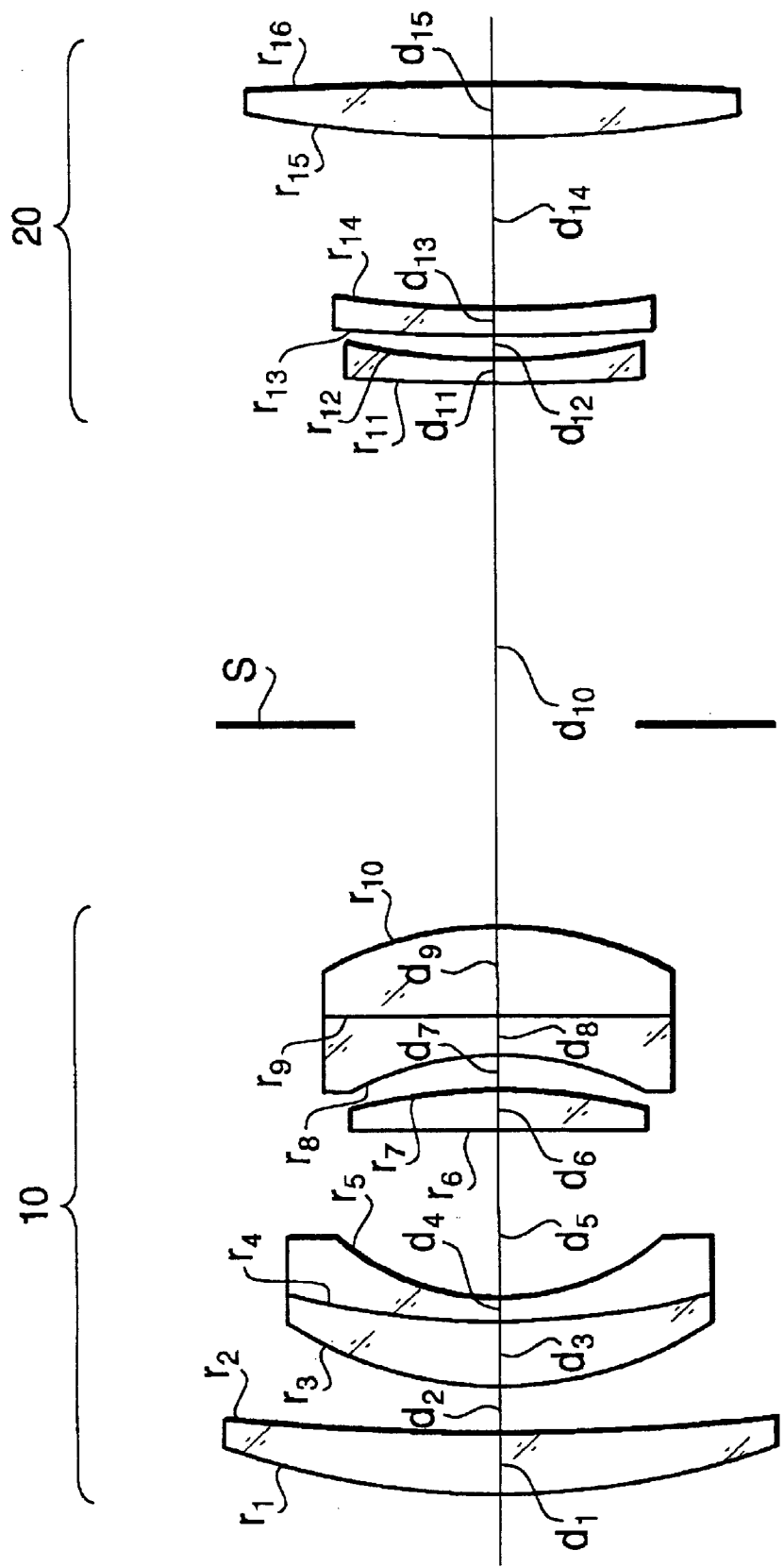
FIG. 4 shows the macro lens system according to the first embodiment at a close focusing state.
Figure 5:
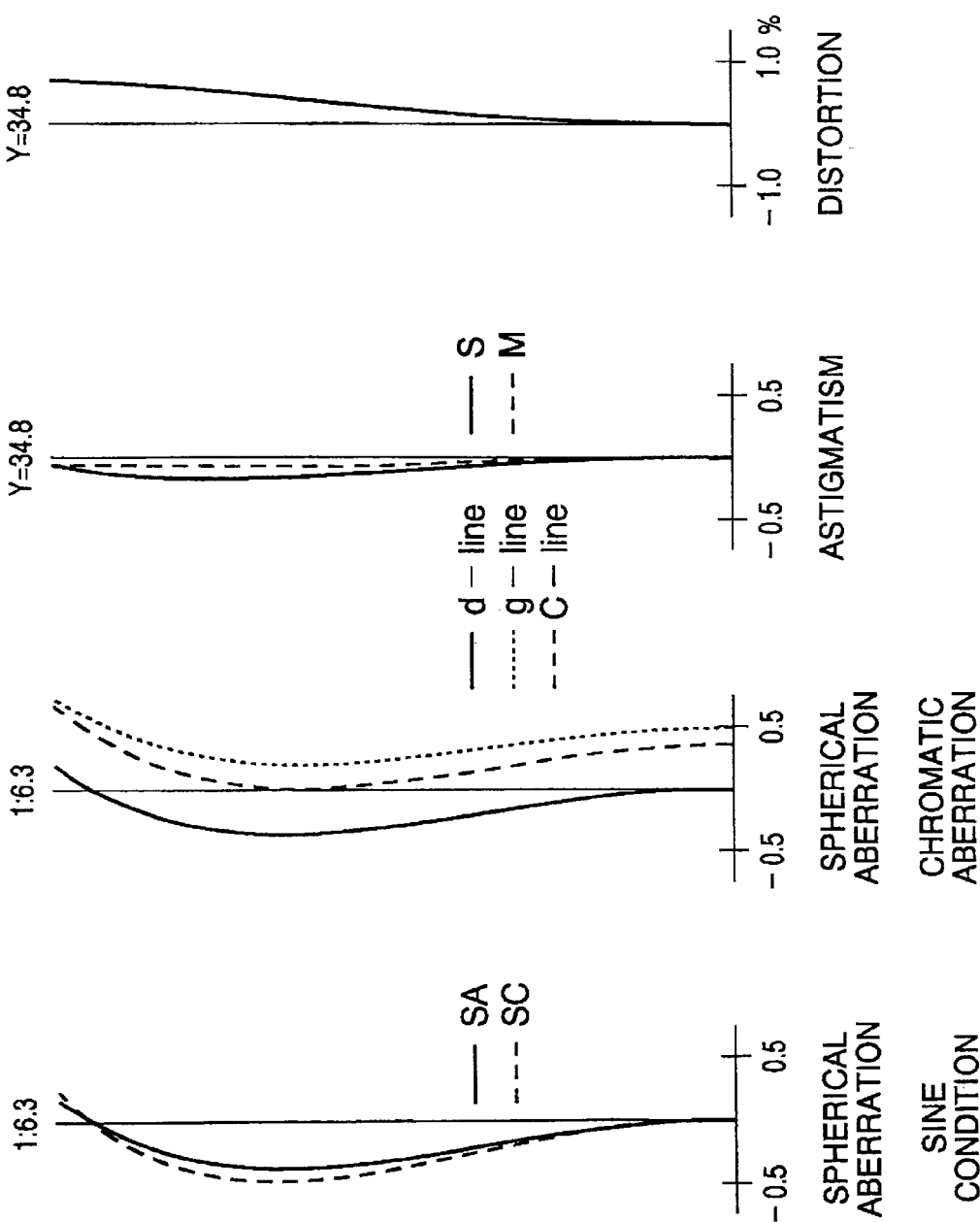
FIGS. 5A–5D show various aberrations of the macro lens system shown in FIG. 4 at the close focusing state.

FIGS. 2 and 4 show the constructions of the macro lens system according to a first embodiment when set in the infinite focusing state and in the close focusing state, respectively. The macro lens system includes the first lens group 10, the aperture stop S and the second lens group 20.

The numerical construction of the first embodiment is indicated in TABLE 1. In the table (and also in Table of other embodiments), $F_{NO}$ denotes the F-number of the macro lens, f (mm) denotes the focal length of the macro lens, M denotes a lateral magnification, fB (mm) denotes a back-focus (a distance between the last surface and the image plane), r (mm) denotes a radius of curvature of a surface, d (mm) denotes a distance between adjacent surfaces along the optical axis, N denotes a refractive index at a wavelength of 588 nm (d-line) and vd denotes an Abbe's number. The values of the F-number, the focal length, the magnification and the back-focus vary in accordance with the focusing movement of the lens groups 10 and 20.

The distance d10 between the first lens group 10 and the aperture S continuously varies from 1.50 mm at the infinite focusing state to 18.98 mm at the close focusing state. The full-opening diameter of the aperture S is constant in spite of the movement thereof.

TABLE 1

$F_{NO}$ = 1:3.8–1:6.3  f = 123.09–103.80
M = 0—1.000  $f_B$ = 76.00–91.75

| Surface Number | R | D | N | vd |
|---|---|---|---|---|
| 1 | 64.350 | 5.28 | 1.78590 | 44.2 |
| 2 | 163.546 | 4.44 | — | — |
| 3 | 30.938 | 5.93 | 1.61800 | 63.4 |
| 4 | 59.500 | 2.10 | 1.54072 | 47.2 |
| 5 | 19.920 | 15.72 | — | — |
| 6 | −6450.000 | 3.64 | 1.48749 | 70.2 |
| 7 | −44.590 | 3.32 | — | — |
| 8 | −24.140 | 3.92 | 1.64769 | 33.8 |
| 9 | −2559.810 | 8.30 | 1.73400 | 51.5 |
| 10 | −28.360 | 1.50–18.98 | — | — |
| Aperture | | 2.50–32.27 | | |
| 11 | 242.198 | 2.10 | 1.77250 | 49.6 |
| 12 | 57.500 | 2.35 | — | — |
| 13 | 315.412 | 2.30 | 1.67790 | 55.3 |
| 14 | 98.849 | 16.03 | — | — |
| 15 | 94.754 | 5.00 | 1.78590 | 44.2 |
| 16 | −540.000 | — | — | — |

FIGS. 3A–3D show third order aberrations of the macro lens system at the infinite focusing state according to the first embodiment. FIG. 3A shows a spherical aberration SA and a sine condition SC, FIG. 3B shows chromatic aberration represented by spherical aberrations for d, g, c-lines, FIG. 3C shows an astigmatism (S: Sagittal, M: Meridional) and FIG. 3D shows distortion. The vertical axis represents F-number in FIGS. 3A and 3B, a half view angle w (degree) in FIGS. 3C and 3D. Unit of the horizontal axis is "mm" in each of FIGS. 3A through 3C and "percent (%)" in FIG. 3D.

FIGS. 5A–5D show third order aberrations of the macro lens system at the close focusing state according to the first embodiment. Each of the vertical axes of FIGS. 5C and 5D represents a distance Y (mm) from an optical axis on an image plane.

Second Embodiment

Figure 6:
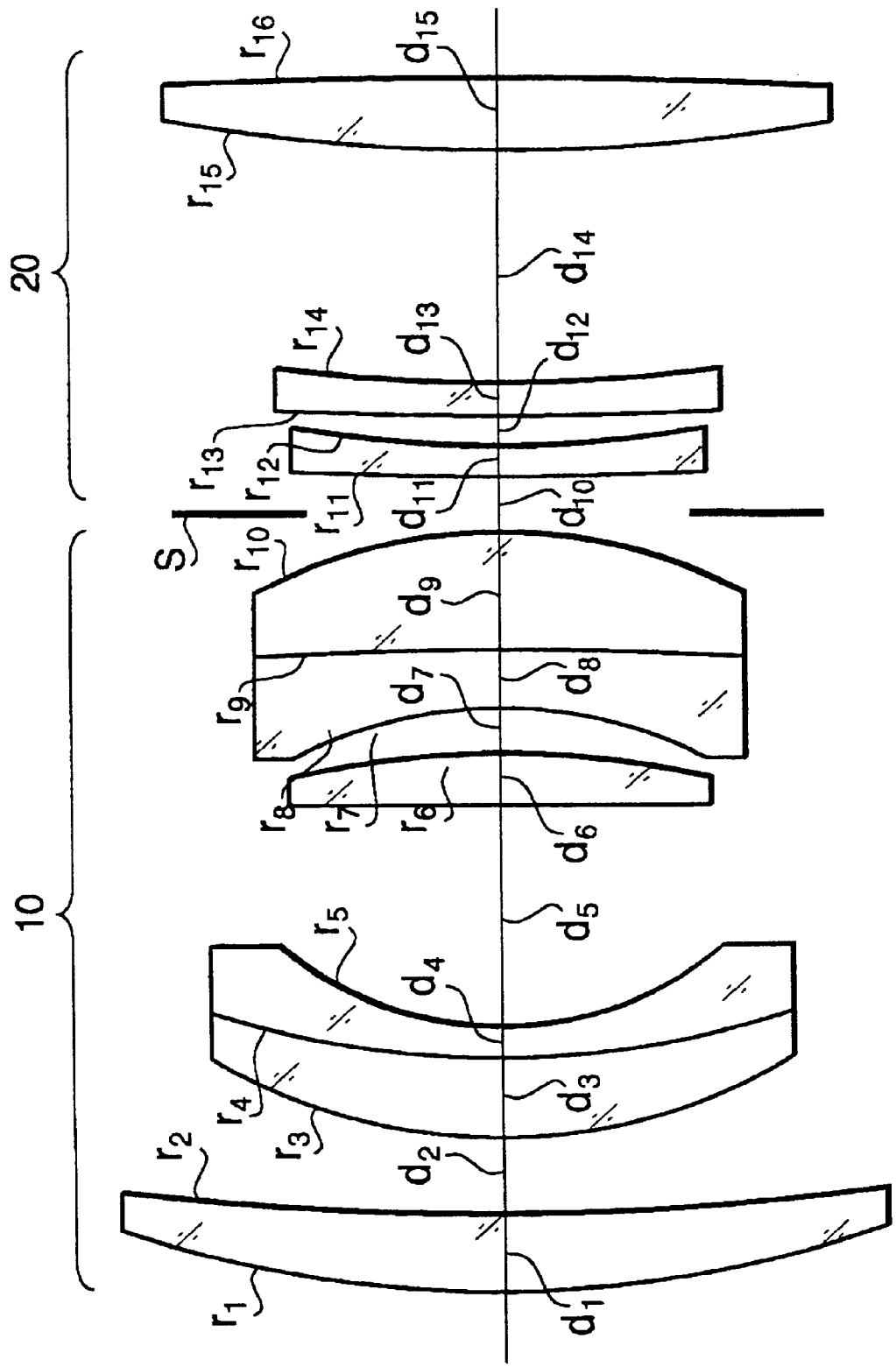
FIG. 6 shows a macro lens system according to a second embodiment at the infinite focusing state.
Figure 7:
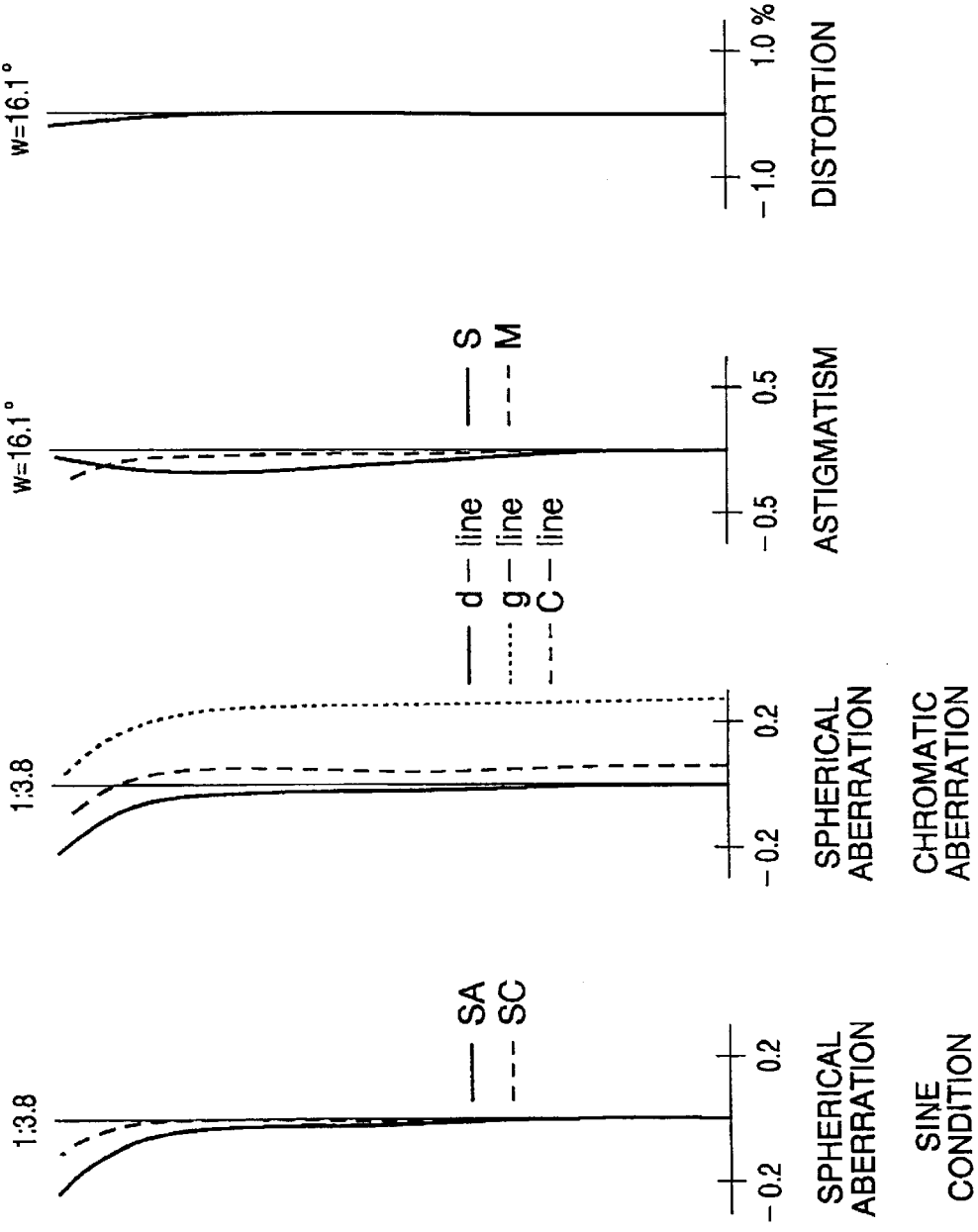
FIGS. 7A–7D show various aberrations of the macro lens system shown in FIG. 6 at the infinite focusing state.
Figure 8:
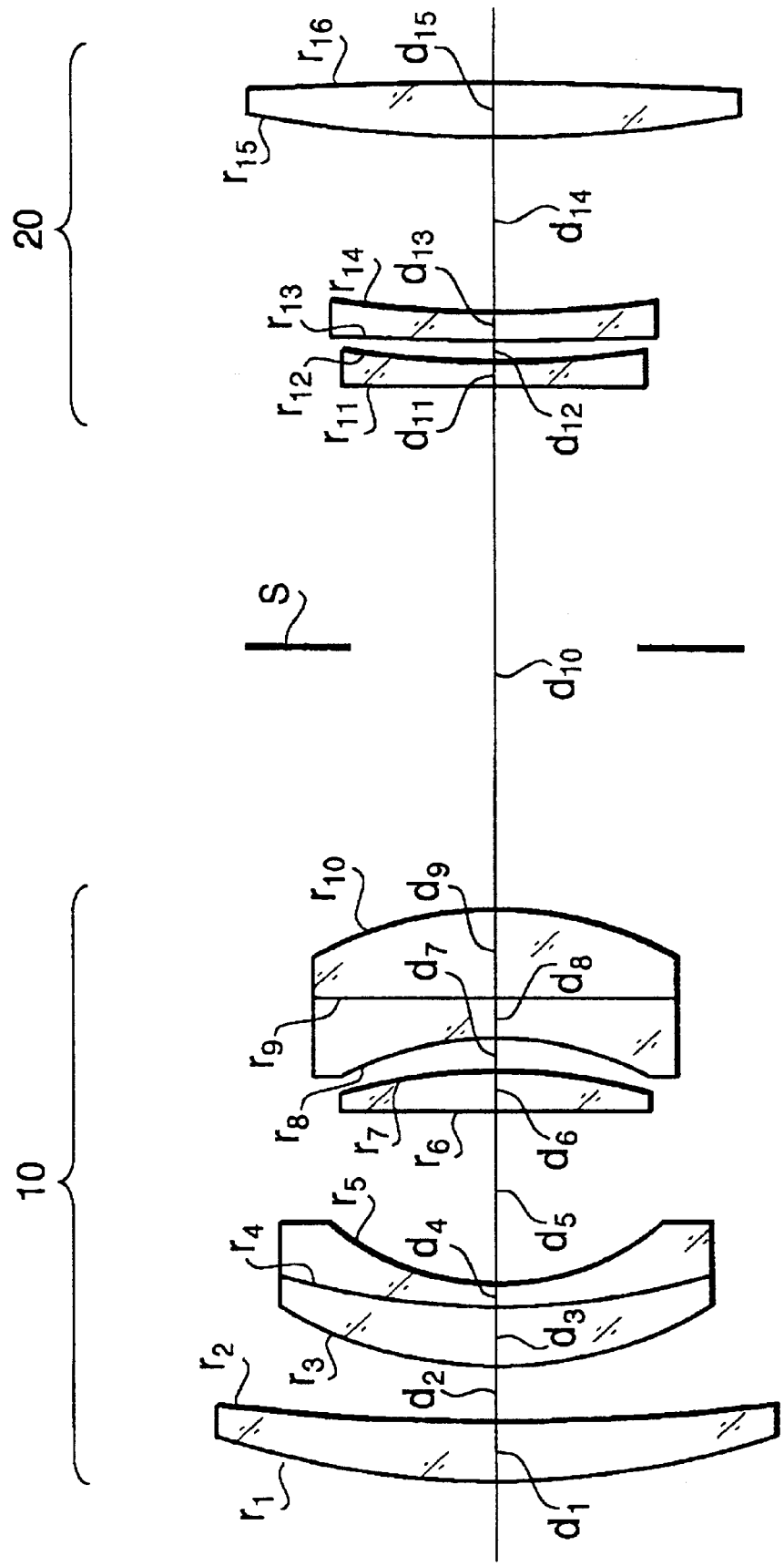
FIG. 8 shows the macro lens system according to the second embodiment at the close focusing state.
Figure 9:
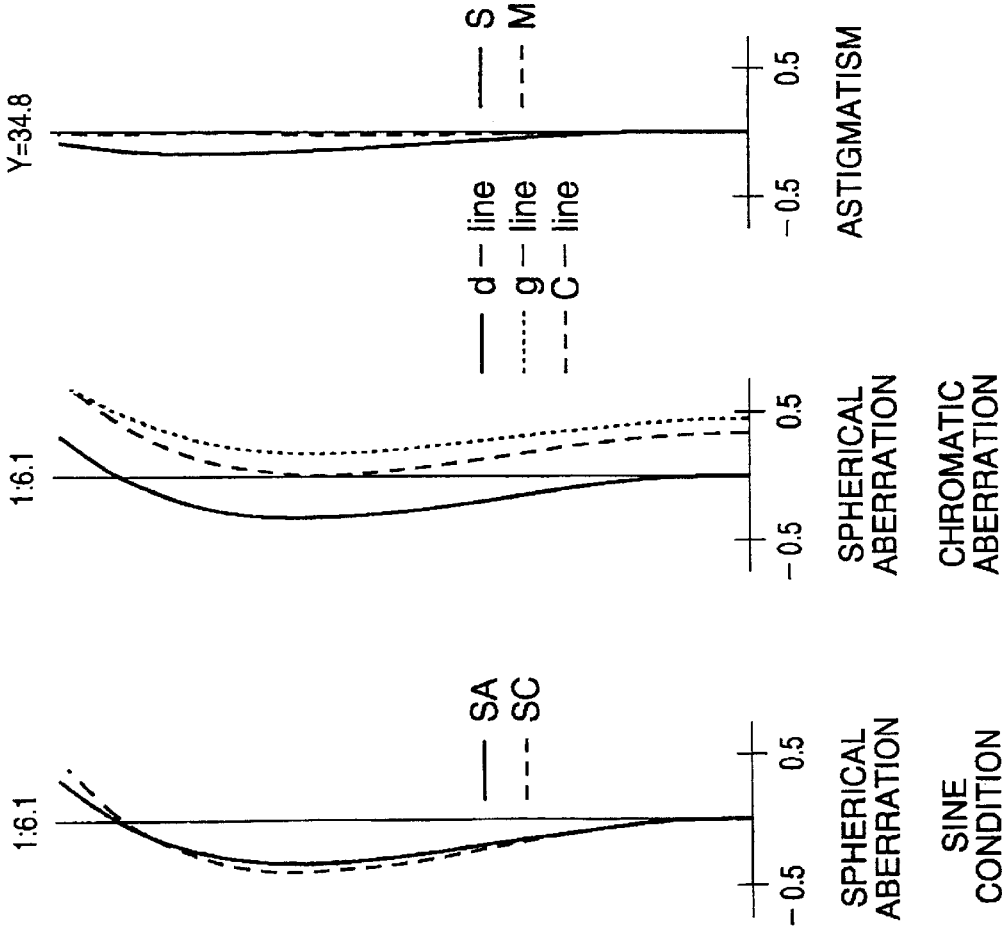
FIGS. 9A–9D show various aberrations of the macro lens system shown in FIG. 8 at the close focusing state.

FIGS. 6 and 8 show the constructions of the macro lens system according to the second embodiment when set in the infinite focusing state and in the close focusing state, respectively. The numerical construction of the second embodiment is indicated in TABLE 2. The distance d10 between the first lens group 10 and the aperture S continuously varies from 1.50 mm at the infinite focusing state to 24.65 mm at the close focusing state. The full-opening diameter of the aperture S is constant in spite of the movement thereof.

TABLE 2

$F_{NO}$ = 1:3.8–1:6.1  f = 121.03–105.93
M = 0—1.000  $f_B$ = 76.00–96.84

| Surface Number | R | D | N | vd |
|---|---|---|---|---|
| 1 | 65.062 | 5.42 | 1.78590 | 44.2 |
| 2 | 172.275 | 5.23 | — | — |
| 3 | 31.424 | 5.51 | 1.61800 | 63.4 |
| 4 | 53.142 | 2.10 | 1.53287 | 47.4 |
| 5 | 20.068 | 15.77 | — | — |
| 6 | 7732.467 | 3.67 | 1.48749 | 70.2 |
| 7 | −44.020 | 3.25 | — | — |
| 8 | −24.226 | 4.00 | 1.65165 | 33.1 |
| 9 | −561.977 | 8.30 | 1.73600 | 51.2 |
| 10 | −28.393 | 1.50–24.65 | — | — |
| Aperture | | 2.50–24.66 | | |
| 11 | 362.574 | 2.10 | 1.78184 | 44.4 |
| 12 | 62.188 | 2.37 | — | — |

TABLE 2-continued $F_{NO}$ = 1:3.8–1:6.1  f = 121.03–105.93
M = 0—-1.000  $f_B$ = 76.00–96.84

| Surface Number | R | D | N | vd |
|---|---|---|---|---|
| 13 | 624.291 | 2.30 | 1.52000 | 63.8 |
| 14 | 94.883 | 16.43 | — | — |
| 15 | 104.157 | 5.00 | 1.78590 | 44.2 |
| 16 | −304.447 | — | — | — |

FIGS. 7A–7D show third order aberrations of the macro lens system at the infinite focusing state according to the first embodiment. FIG. 7A shows a spherical aberration SA and a sine condition SC, FIG. 7B shows chromatic aberration represented by spherical aberrations for d, g, c-lines, FIG. 7C shows an astigmatism (S: sagittal, M: Meridional) and FIG. 7D shows distortion. The vertical axis represents F-number in FIGS. 7A and 7B, a half view angle w (degree) in FIGS. 7C and 7D. Unit of the horizontal axis is "mm" in each of FIGS. 7A through 7C and "percent (%)" in FIG. 7D.

FIGS. 9A–9D show third order aberrations of the macro lens system at the close focusing state according to the second embodiment. Each of the vertical axes of FIGS. 9C and 9D represents a distance Y (mm) from an optical axis on an image plane.

Third Embodiment

Figure 10:
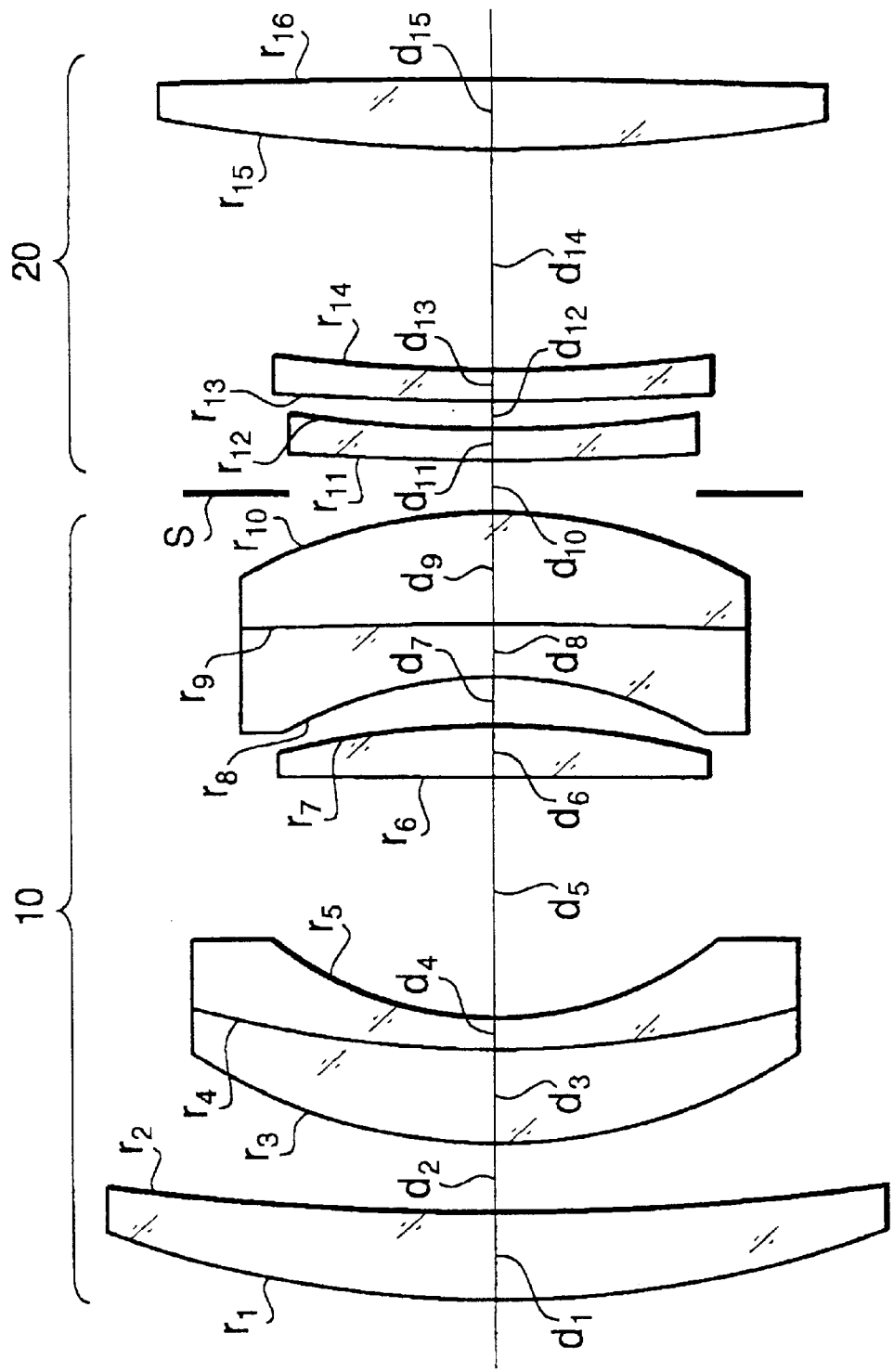
FIG. 10 shows a macro lens system according to a third embodiment at the infinite focusing state.
Figure 11:
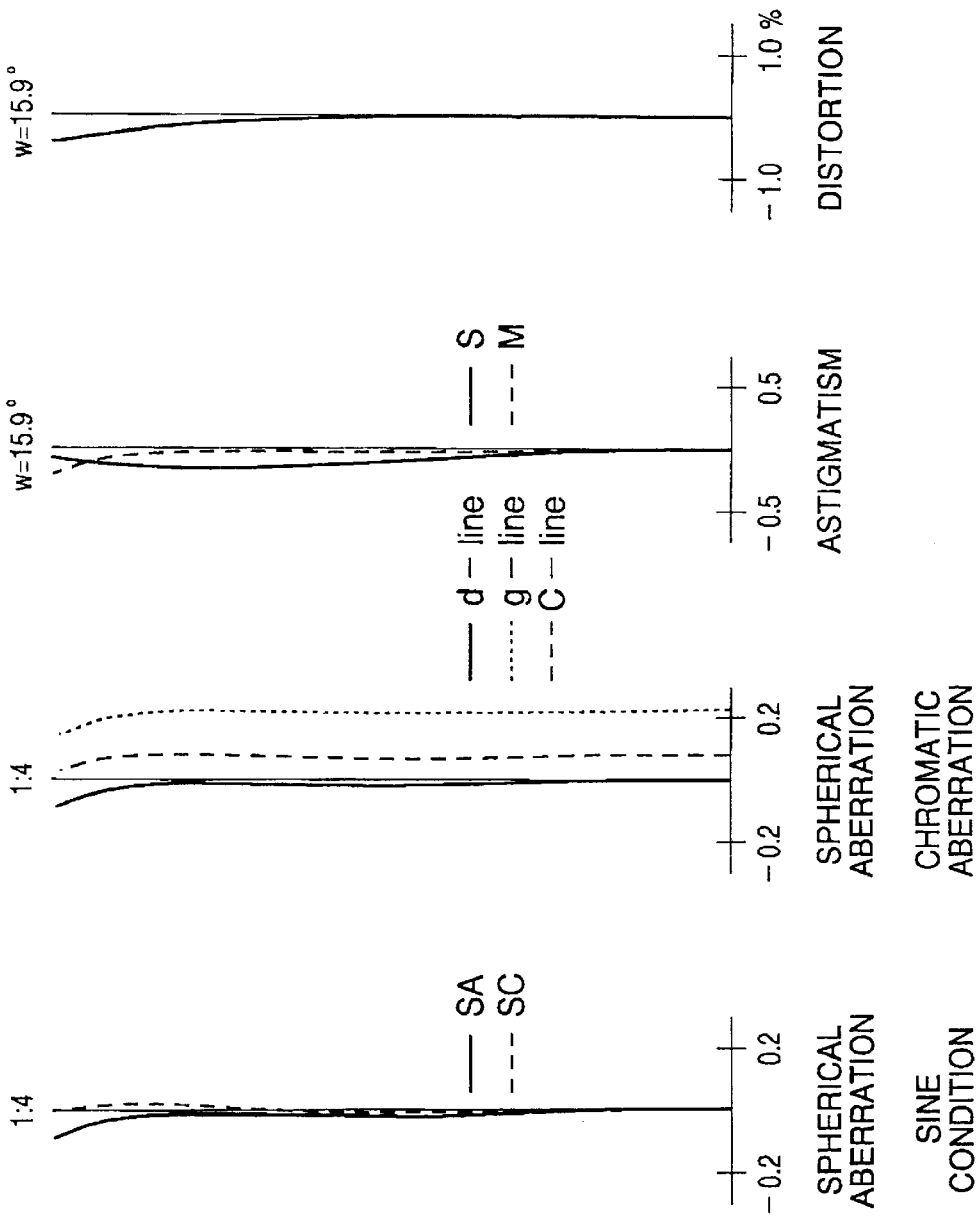
FIGS. 11A–11D show various aberrations of the macro lens system shown in FIG. 10 at the infinite focusing state.
Figure 12:
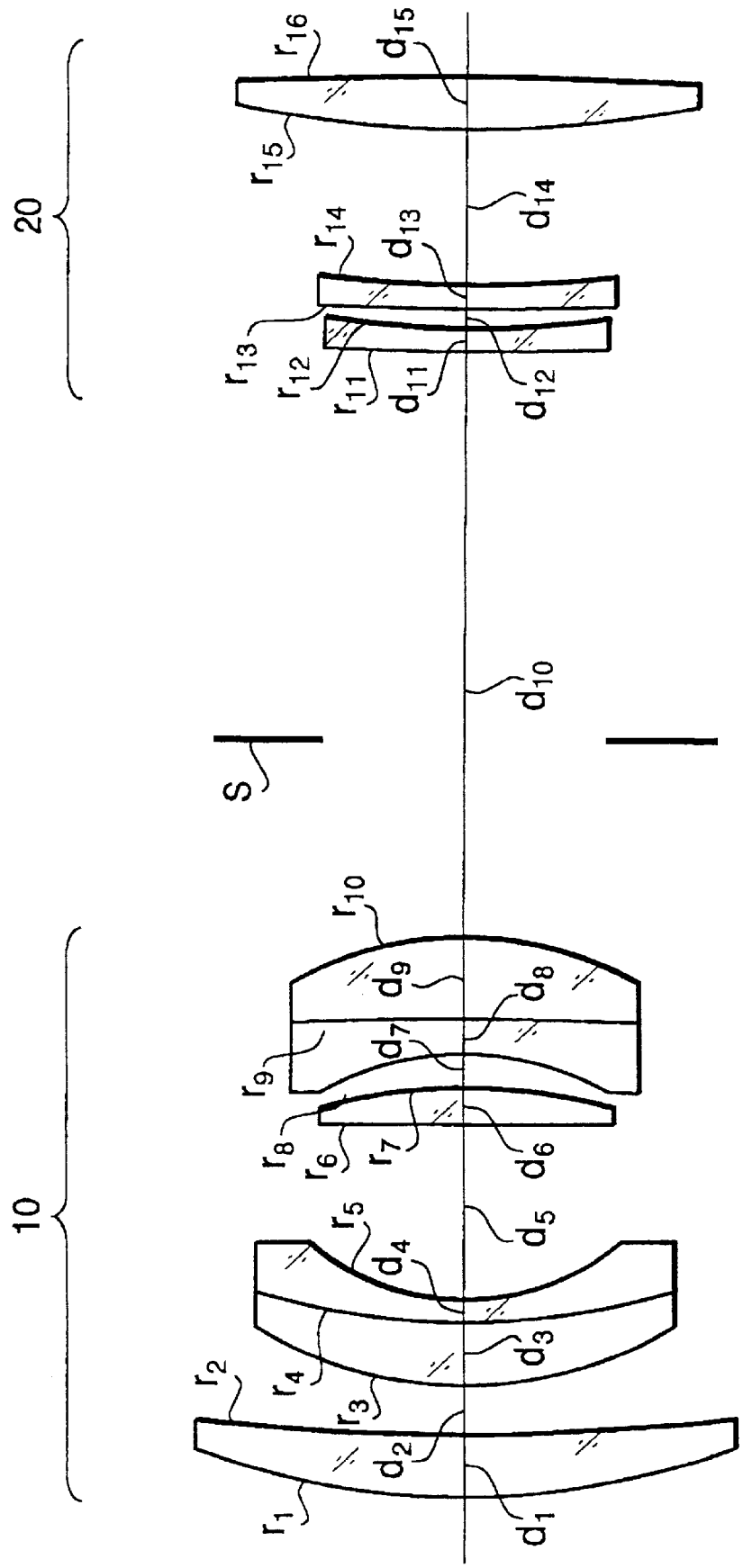
FIG. 12 shows the macro lens system according to the third embodiment at the close focusing state.
Figure 13:
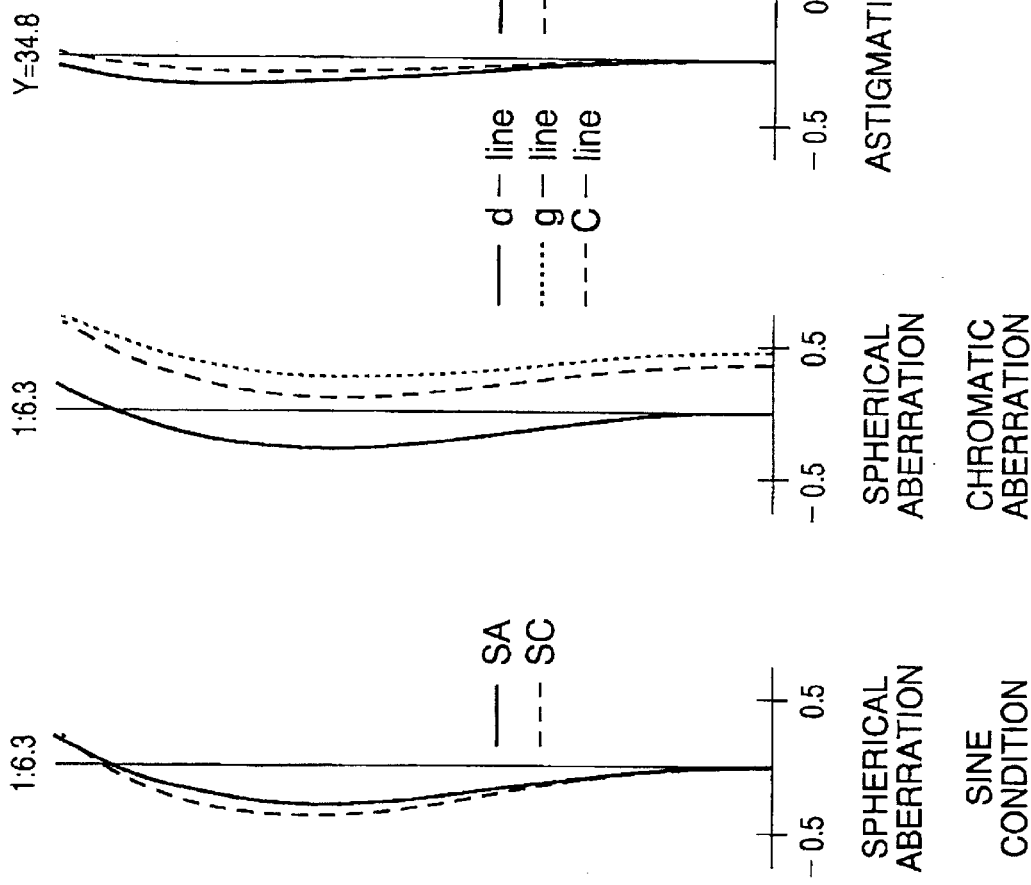
FIGS. 13A–13D show various aberrations of the macro lens system shown in FIG. 12 at the close focusing state.

FIGS. 10 and 12 show the concrete constructions of the macro lens system of the third embodiment when set in the infinite focusing state and in the close focusing state respectively. The numerical construction of the third embodiment is described in TABLE 3. The distance d10 between the first lens group 10 and the aperture S continuously varies from 1.50 mm at the infinite focusing state to 19.60 mm at the close focusing state. The full-opening diameter of the aperture S continuously varies according to the change of the literal magnification M. Examples of the full-opening diameter of the aperture S are indicated in TABLE 4.

TABLE 3

$F_{NO}$ = 1:4.0–1:6.1  f = 123.03–108.05
M = 0—-1.000  $f_B$ = 76.00–90.01

| Surface Number | R | D | N | vd |
|---|---|---|---|---|
| 1 | 63.621 | 5.97 | 1.78590 | 44.2 |
| 2 | 153.735 | 4.86 | — | — |
| 3 | 32.213 | 6.43 | 1.61800 | 63.4 |
| 4 | 60.988 | 2.10 | 1.54072 | 47.2 |
| 5 | 20.382 | 17.18 | — | — |
| 6 | −1199.234 | 3.60 | 1.48749 | 70.2 |
| 7 | −45.774 | 3.40 | — | — |
| 8 | −24.451 | 3.72 | 1.64769 | 33.8 |
| 9 | −510.512 | 8.03 | 1.73400 | 51.5 |
| 10 | −28.532 | 1.50–19.60 | — | — |
| Aperture |  | 2.50–39.30 |  |  |
| 11 | 290.697 | 2.10 | 1.77541 | 38.6 |
| 12 | 64.359 | 2.12 | — | — |
| 13 | 251.965 | 2.30 | 1.68809 | 56.8 |
| 14 | 91.422 | 15.54 | — | — |
| 15 | 97.418 | 5.00 | 1.78913 | 39.1 |
| 16 | −418.865 | — | — | — |

TABLE 4

| M | Full Opening Diameter |
|---|---|
| 0 | 11.33 (mm) *Minimum diameter |
| −0.5 | 12.02 (mm) |
| −1.0 | 12.88 (mm) *Maximum diameter |

FIGS. 11A–11D show third order aberrations of the macro lens system at the infinite focusing state according to the first embodiment. FIG. 11A shows a spherical aberration SA and a sine condition SC, FIG. 11B shows chromatic aberration represented by spherical aberrations for d, g, c-lines, FIG. 11C shows an astigmatism (S: Sagittal, M: Meridional) and FIG. 11D shows distortion. The vertical axis represents F-number in FIGS. 11A and 11B, a half view angle w (degree) in FIGS. 11C and 11D. Unit of the horizontal axis is "mm" in each of FIGS. 11A through 11C and "percent (%)" in FIG. 7D.

FIGS. 13A–13D show third order aberrations of the macro lens system at the close focusing state according to the third embodiment. Each of the vertical axes of FIGS. 13C and 13D represents a distance Y (mm) from an optical axis on an image plane.

The following TABLE 5 indicates values regarding conditions (1), (2), (3) and (4) for the numerical embodiments.

TABLE 5

|  | First embodiment | Second embodiment | Third embodiment |
|---|---|---|---|
| Condition (1) |  |  |  |
| Fe/{F(1 − Mc)} | 0.829 | 0.792 | 0.763 |
| Condition (2) |  |  |  |
| Fe | 6.3 | 6.1 | 6.1 |
| Condition (3) |  |  |  |
| XS/X1 | 0.72 | 0.65 | 0.74 |
| Condition (4) |  |  |  |
| X2/X1 | 0.25 | 0.32 | 0.20 |

Since each of the embodiments satisfies conditions (1), (2), (3) and (4), it is suitable to the camera that provides the TTL auto-focus system.

The present disclosure relates to subject matter contained in Japanese Patent Application No. HEI 9-334419, filed on Dec. 4, 1997, which is expressly incorporated herein by reference in its entirety.

What is claimed is:

1. A macro lens system in which a focusing state is adjustable between an infinite focusing state, where said macro lens system focuses on an object at infinity, and a close focusing state where said macro lens system focuses on an object at the minimum object distance, the macro lens system comprising:

a focusing lens group that moves along an optical axis between an infinite focusing position proximate an image plane at said infinite focusing state, and a close focusing position further from said image plane at said close focusing state than at said infinite focusing state, said focusing lens group comprising a first lens group having a positive power and a second lens group having a negative power, said first and second lens groups being driven to move, in a focusing operation, along said optical axis in the same direction, said first and second lens groups being located at positions closer to an object when the object is close than when said object is far, a distance between said first and second lens groups becoming larger as an object becomes closer;

an aperture that is movable along said optical axis, said aperture being provided between said first and second lens groups; and a driving mechanism for independently moving said focusing lens group and said aperture along said optical axis, wherein said driving mechanism moves said aperture toward the object side to increase an effective F-number as said focusing lens group is moved to the object side, and wherein said driving mechanism moves, in a focusing operation, said aperture toward the object side as said first and second lens groups are moved towards the object, the moving amount of said aperture being smaller than the moving amount of said first lens group.

2. The macro lens system according to claim 1, wherein the following conditions are satisfied:

$$0.5 < Fe/\{F(1-Mc)\} < 0.9$$

and $$Fe < 7$$

where,

F is an effective F-number at the infinite focusing state;

Fe is an effective F-number at the close focusing state; and

Mc is a lateral magnification at the close focusing state.

3. The macro lens system according to claim 1, wherein the following condition is satisfied:

$$0 < X2/X1 < 0.5$$

where,

X1 is a total moving amount of said first lens group for the entire focusing range; and X2 is a total moving amount of said second lens group for the entire focusing range.

4. The macro lens system according to claim 1, wherein a full-opening diameter of said aperture is constant.

5. The macro lens system according to claim 1, wherein a full-opening diameter of said aperture increases as said focusing lens group moves toward the object.

6. A macro lens system in which a focusing state is adjustable between an infinite focusing state, where said macro lens system focuses on an object at infinity, and a close focusing state where said macro lens system focuses on an object at the minimum object distance, the macro lens system comprising:

a focusing lens group that moves along an optical axis between an infinite focusing position proximate an image plane at said infinite focusing state, and a close focusing position further from said image plane at said close focusing state than at said infinite focusing state;

an aperture that is movable along said optical axis; and a driving mechanism for independently moving said focusing lens group and said aperture along said optical axis, wherein said driving mechanism moves said aperture toward the object side to increase an effective F-number as said focusing lens group is moved towards the object side, wherein the following condition is satisfied:

$$0.5 < XS/X1 < 1.0$$

where,

X1 is a total moving amount of said first lens group for the entire focusing range; and XS is a total moving amount of said aperture for the entire focusing range.

7. The macro lens system according to claim 6, wherein the following conditions are satisfied:

$$0.5 < Fe/\{F(1-Mc)\} < 0.9,$$

and $$Fe < 7$$

where,

F is an effective F-number at the infinite focusing state;

Fe is an effective F-number at the close focusing state; and

Mc is a lateral magnification at the close focusing state.

8. The macro lens system according to claim 6, wherein said focusing lens group comprises a first lens group having a positive power and a second lens group having a negative power, said first and second lens groups being driven to move, in a focusing operation, along said optical axis in the same direction, said first and second lens groups being located at positions closer to an object when the object is close than when the object is far, a distance between said first and second lens groups becoming larger as an object becomes closer, and wherein said aperture is provided between said first and second lens groups and said driving mechanism moves, in a focusing operation, said aperture toward the object side as said first and second lens groups are moved towards the object, the moving amount of said aperture being smaller than the moving amount of said first lens group.

9. The macro lens system according to claim 8, wherein the following condition is satisfied:

$$0 < X2/X1 < 0.5$$

where,

X1 is a total moving amount of said first lens group for the entire focusing range; and X2 is a total moving amount of said second lens group for the entire focusing range.

10. The macro lens system according to claim 6, wherein a full-opening diameter of said aperture is constant.

11. The macro lens system according to claim 6, wherein a full-opening diameter of said aperture increases as said focusing lens group moves toward the object.

12. A macro lens system in which a focusing state is adjustable between an infinite focusing state, where said macro lens system focuses on an object at infinity, and a close focusing state where said macro lens system focuses on an object at the minimum object distance, the macro lens system comprising:

a focusing lens group that moves along an optical axis between an infinite focusing position proximate an image plane at said infinite focusing state, and a close focusing position further from said image plane at said close focusing state than at said infinite focusing state;

an aperture that is movable along said optical axis; and a driving mechanism for independently moving said focusing lens group and said aperture along said optical axis, wherein said driving mechanism moves said aperture toward the object side to increase an effective F-number as said focusing lens group is moved to the object side, wherein the following condition is satisfied:

$0 < X2/X1 < 0.5$ where,

X1 is a total moving amount of said first lens group for the entire focusing range; and X2 is a total moving amount of said second lens group for the entire focusing range.

13. The macro lens system according to claim 12, wherein the following conditions are satisfied:

$0.5 < Fe/\{F(1-Mc)\} < 0.9,$ and $Fe < 7$ where,

F is an effective F-number at the infinite focusing state;

Fe is an effective F-number at the close focusing state; and

Mc is a lateral magnification at the close focusing state.

14. The macro lens system according to claim 12, wherein a full-opening diameter of said aperture is constant.

15. The macro lens system according to claim 12, wherein a full-opening diameter of said aperture increases as said focusing lens group moves toward the object.

* * * * *